United States Patent [19]

Zama et al.

[11] Patent Number: 5,171,787
[45] Date of Patent: Dec. 15, 1992

[54] SILICONE-BASED COMPOSITE RUBBER COMPOSITION AND USES THEREOF

[75] Inventors: Yoshiaki Zama; Itsuki Umeda; Seizo Katayama, all of Tokyo; Yuichi Funahashi, Gunma; Junichiro Watanabe, Gunma; Kiyoshi Takeda, Gunma; Hirofumi Yoshida, Gunma, all of Japan

[73] Assignees: Japan Synthetic Rubber Co., Ltd.; Toshiba Silicone Co., Ltd., both of Tokyo, Japan

[21] Appl. No.: 543,545

[22] Filed: Jun. 26, 1990

[30] Foreign Application Priority Data

Jun. 26, 1989 [JP] Japan .................. 1-160967

[51] Int. Cl.$^5$ .............................. C08L 47/00
[52] U.S. Cl. .......................... 525/105; 525/100; 525/106
[58] Field of Search ............... 525/100, 105, 106

[56] References Cited

U.S. PATENT DOCUMENTS 3,536,779 10/1970 Bedikian et al. ............ 428/290
4,714,734 12/1987 Hashimoto et al. .......... 525/104

FOREIGN PATENT DOCUMENTS 0220809 6/1987 European Pat. Off. .
2044684 4/1971 Fed. Rep. of Germany .
2837117 3/1979 Fed. Rep. of Germany .

*Primary Examiner*—John C. Bleutge
*Assistant Examiner*—David E. Aylward
*Attorney, Agent, or Firm*—Oblon, Spivak, McClelland, Maier & Neustadt

[57] ABSTRACT

A silicone-based composite rubber composition having good processability on rolls which is obtained by compounding a rubber-forming polymer (A) comprising a polyorganosiloxane and an organic rubber, a silicon compound (B) having at least two hydrolyzable groups per molecule which are able to undergo hydrolysis and condensation reactions with silanols, and a heavy metal compound, amine, or quaternary ammonium salt (C) which catalyzes the hydrolysis and condensation reactions, and allowing the resulting formulation to undergo hydrolysis and condensation reactions while the formulation is kept being deformed by shearing; a crosslinkable, silicone-based composite rubber composition comprising the silicone-based composite rubber composition having blended therewith an organic rubber-crosslinking agent; and an oil seal and a rubber hose both obtained from the crosslinkable, silicone-based composite rubber composition.

18 Claims, No Drawings

SILICONE-BASED COMPOSITE RUBBER COMPOSITION AND USES THEREOF

FIELD OF THE INVENTION

The present invention relates to a silicone-based composite rubber composition which has good processability on rolls and can give cured elastomers having high mechanical strength and improved heat and cold resistance, a crosslinkable, silicone-based composite rubber composition obtained by blending a crosslinking agent for the organic rubber with the above composition, and an oil seal and a rubber hose both obtained from the crosslinkable composition. The silicone-based composite rubber composition is obtained by compounding a rubber-forming polymer (A) comprising a polyorganosiloxane and an organic rubber, a silicon compound (B) having at least two hydrolyzable groups per molecule which are able to undergo hydrolysis and condensation reactions with silanols, and a heavy metal compound, amine, or quaternary ammonium salt (C) which catalyzes the hydrolysis and condensation reactions, and allowing the resulting formulation to undergo hydrolysis and condensation reactions while the formulation is kept being deformed by shearing.

BACKGROUND OF THE INVENTION

Silicone rubber is characterized as having excellent heat resistance, weather resistance, release properties, and other properties, but has been defective in that the silicone rubber is inferior in breaking strength, water resistance, and gas impermeability as compared to general-purpose organic rubbers, or synthetic rubbers mainly composed of carbon skeleton.

Various attempts have, therefore, been made to blend silicone rubber with organic rubbers so as to obtain rubber compositions that retain the advantageous features of the two components. For example, such compositions so far proposed include those obtained by blending the two components merely mechanically as disclosed in JP-A-54-41957 (the term "JP-A" as used herein means an "unexamined published Japanese patent application), JP-A-55-139604, and JP-A-56-76444 and those obtained by blending the two components in such a manner that the polyorganosiloxane is bonded to carbon-carbon double bonds (—C=C—) in the organic rubber as described in JP-A-54-157149, JP-B-55-15497 (the term "JP-B" as used herein means an "examined Japanese patent publication), JP-A-55-31817, JP-A-56-76440, and JP-A-56-76441.

In practice, however, it is difficult to obtain uniform mixtures of silicone rubber and organic rubbers, particularly of silicone rubber and oil-resistant rubbers having polar groups, through kneading because of the poor compatibility between the two components.

Moreover, a blend of components that are not basically co-vulcanizable with one another gives vulcanized elastomers whose properties are exceedingly poor, even if each component can cures into an elastomer having excellent properties. Thus, the features of the two components have not yet been fully exhibited.

SUMMARY OF THE INVENTION

The present invention has been completed in view of the technical problems accompanying the above-described conventional techniques.

Accordingly, an object of the present invention is to provide a silicone-based composite rubber composition which has been improved so much in the microscopic miscibility between silicone rubber and an organic rubber as to be free of phase separation in an unvulcanized state and which not only exhibits good processability on rolls but can give cured elastomers excellent in mechanical strength, heat resistance, cold resistance, and oil resistance.

Another object of the present invention is to provide a crosslinkable, silicone-based composite rubber composition comprising the silicone-based composite rubber composition having blended therewith an organic rubber-crosslinking agent.

A further object of the present invention is to provide an oil seal and a rubber hose both obtained from the above crosslinkable composition.

DETAILED DESCRIPTION OF THE INVENTION

In one embodiment, the present invention provides a silicone-based composite rubber composition which is obtained by compounding 100 parts by weight of a rubber-forming polymer (A) comprising as main components 3 to 70% by weight of a polyorganosiloxane (I) represented by the average composition formula $R_aSiO_{(4-a)/2}$ wherein R is a substituted or unsubstituted monovalent organic group, with 0.005 to 3 mol % of the R groups being hydroxyl, and a is a number of 1.900 to 2.004, and having a degree of polymerization of 50 to 10,000, and 97 to 30% by weight of an organic rubber (II), 0.005 to 50 parts by weight of a silicon compound (B) having at least two hydrolyzable groups per molecule which are able to undergo hydrolysis and condensation reactions with silanols, and 0.0001 to 10 parts by weight of a heavy metal compound, amine, or quaternary ammonium salt (C) which catalyzes the hydrolysis and condensation reactions, and allowing the resulting formulation to undergo hydrolysis and condensation reactions while the formulation is kept being deformed by shearing.

In another embodiment, the present invention provides a crosslinkable, silicone-based composite rubber composition obtained by blending a crosslinking agent for the organic rubber (II) with the above silicone-based composite rubber composition.

In further embodiment, the present invention provides an oil seal and a rubber hose both obtained from the above crosslinkable, silicone-based composite rubber composition.

Polyorganosiloxane (I) contained in component (A) used for producing the silicone-based composite rubber composition of this invention is a compound having the average composition formula described above and which is substantially linear. However, part of polyorganosiloxane (I) may be of a branched and three-dimensional structure, and polyorganosiloxane (I) may be a homopolymer, a copolymer, or a mixture thereof.

Examples of the substituted or unsubstituted monovalent organic group contained in this polyorganosiloxane (I) include methyl, ethyl, propyl, vinyl, and phenyl groups, as well as halogen-substituted groups derived from these hydrocarbon groups. It is necessary that 0.005 to 3 mol %, preferably 0.01 to 2 mol %, of the silicon-bonded organic groups in the molecule be hydroxyl. If the content of such hydroxyl groups is too low, the reactions (hydrolysis and condensation reactions) of the polyorganosiloxane with the silicon compound described later are insufficient, so that the resulting composition obtained by using such polyorganosiloxane (I) shows poor processability on rolls and gives vulcanized products that are poor in such properties as mechanical strength, heat resistance, and cold resistance. If the content of silicon-bonded hydroxyl groups is too high, the hydrolysis and condensation reactions will proceed so rapidly that non-uniform kneading results, which adversely affects the physical properties of the rubber composition.

The value of a in the average composition formula described above is in the range of from 1.900 to 2.004, preferably from 1.950 to 2.002. If it is less than 1.900, desired mechanical strength and heat resistance are not attainable. If a exceeds 2.004, polyorganosiloxanes having the necessary degree of polymerization cannot be obtained.

The degree of polymerization of polyorganosiloxane (I) is in the range of from 50 to 10,000, preferably from 100 to 1,500. If the degree of polymerization is less than 50, rubber compositions that can give vulcanized products with high mechanical strength cannot be obtained. On the other hand, polyorganosiloxanes having a degree of polymerization exceeding 10,000 are difficult to synthesize.

The terminals of the molecular chain of polyorganosiloxane (I) may be blocked with a suitable group such as hydroxyl, alkoxy, trimethylsilyl, dimethylvinylsilyl, methylphenylvinylsilyl, or methyldiphenylsilyl.

Examples of organic rubber (II) used for producing the rubber composition of this invention include natural rubber, isoprene rubber, styrene-butadiene rubber, chloroprene rubber, butadiene rubber, acrylonitrile-butadiene rubber, ethylene-$\alpha$-olefin rubbers, chlorosulfonated polyethylene, butyl rubber, fluororubbers, acrylic rubbers, epichlorohydrin rubbers, ethylene-vinyl acetate rubber, and ethylene-acrylic rubbers.

Of those, acrylic rubbers, ethylene-$\alpha$-olefin rubbers, acrylonitrile-butadiene rubber, fluororubbers, epichlorohydrin rubbers, and chlorosulfonated polyethylene are preferred. Of these, acrylic rubbers and fluororubbers are particularly advantageous from the standpoint of obtaining rubber compositions that give vulcanized products having all of oil resistance, cold resistance, and heat resistance.

Examples of acrylic rubbers that can be used as organic rubber (II) include polymers of alkyl esters of (meth)acrylic acid and a copolymer of such alkyl ester(s) as the main component(s) and a comonomer having a crosslinkable group as described below.

As the alkyl (meth)acrylate monomer for use in producing the above polymer or copolymer, one or more of ethyl (meth)acrylate, propyl (meth)acrylate, butyl (meth)acrylate, methoxyethyl (meth)acrylate, ethoxyethyl (meth)acrylate, and the like can be used.

Such acrylic rubber can contain units derived from one or more monomers selected from acrylonitrile, styrene, 1,3-butadiene, isoprene, isobutylene, chloroprene, ethylene, propylene, vinyl acetate, acrylic acid, and the like, in an amount of about 40% by weight or less based on the weight of the acrylic rubber.

It is preferred that the acrylic rubber contains an epoxy group, a halogen atom, a carboxyl group, or an unsaturated hydrocarbon group as a crosslinkable group as described above.

Examples of monomers that provide such crosslinkable group include vinyl chloroacetate, allyl chloroacetate, 2-chloroethyl vinyl ether, allyl glycidyl ether, glycidyl methacrylate, acrylic acid, methacrylic acid, maleic acid, fumaric acid, itaconic acid, 5-ethylidene-2-norbornene, dicyclopentadiene, vinyl acrylate, allyl methacrylate, dicyclopentenyl acrylate, dicyclopentenyloxyethyl acrylate, p-vinylphenyl(dimethyl)-vinylsilane, and 3-methacryloxypropyldimethylvinylsilane. These may be used alone or in combination of two or more thereof.

Examples of fluororubbers that can be used as organic rubber (II) include: copolymers of two or more of fluorine-containing monomers such as vinylidene fluoride, hexafluoropropene, pentafluoropropene, trifluoroethylene, trifluorochloroethylene, tetrafluoroethylene, vinyl fluoride, perfluoro(methyl vinyl ether), and perfluoro(propylvinylidene); and copolymers of such fluorine-containing monomers and other monomers copolymerizable therewith such as vinyl compounds (e.g., acrylic esters), olefin compounds (e.g., propylene), diene compounds (e.g., isoprene, butadiene, and dicyclopentadiene), and halogenated vinyl compounds containing chlorine, bromine, or iodine.

Specific examples of such fluororubbers include vinylidene fluoride-hexafluoropropylene-tetrafluoroethylene terpolymers and tetrafluoroethylene-vinylidene fluoride-propylene terpolymers.

In order to ensure uniform dispersibility with polyorganosiloxane (I) and to permit efficient kneading with the same, it is advantageous for organic rubber (II) to have a Mooney viscosity ($ML_{1+4}$, 100° C.) of from 10 to 200, preferably from 20 to 150, more preferably from 30 to 100. By using organic rubber (II) that satisfies this viscosity requirement, rubber compositions having stable quality and characteristics can be obtained.

If the Mooney viscosity of organic rubber (II) is outside the range specified above, kneading efficiency and dispersibility are impaired, so that it becomes difficult to stably produce vulcanized products having good cold and heat resistance and other properties.

The proportion of polyorganosiloxane (I) to organic rubber (II) in component (A) ranges from 3:97 to 70:30 by weight, preferably from 5:95 to 50:50 by weight. If the proportion of polyorganosiloxane (I) in component (A) is too small, desired compositions cannot be obtained because when such component (A) is mixed with silicon compound (B) having at least two hydrolyzable groups per molecule which are able to undergo hydrolysis and condensation reactions with silanols and this mixture is kneaded under shear deformation in the presence of a heavy metal compound, amine, or quaternary ammonium salt (C) which catalyzes the hydrolysis and condensation reactions, as described later, the desired hydrolysis and condensation reactions cannot take place sufficiently. On the other hand, if the proportion of polyorganosiloxane (I) is too large, the processability of the resulting composition and the mechanical strength of final vulcanized products are impaired.

Silicon compound (B) used for producing the silicone-based composite rubber composition of this invention is not particularly limited in structure as long as the compound contains at least two hydrolyzable groups per molecule which are able to undergo hydrolysis and condensation reactions with silanols in order that this silicon compound crosslinks polyorganosiloxane (I) through hydrolysis and condensation reactions therewith. The following compounds are described as the examples thereof.

That is, examples of silicon compound (B) include organosilanes represented by the formula $R^8_c SiX_{4-c}$ (wherein $R^8$ is a monovalent hydrocarbon group; X is a group directly bonded to the silicon atom, with the X-Si bond being hydrolyzable) and partially hydrolyzed condensates of these organosilanes. Where silicon compound (B) is a silane, c in the formula is 0 or 1; where silicon compound (B) is a partially hydrolyzed condensate of a silane, the condensate is a partially hydrolyzed co-condensate of silanes of the above formula where c is selected from 0, 1, and 3. In either case, silicon compound (B) has more than two X groups per molecule. X in the above formula is directly bonded to the silicon atom and represents a group or atom selected from an acyloxy group such as acetoxy; an alkoxy group such as methoxy, ethoxy, isopropoxy or butoxy; an oxime group such as acetone oxime or methyl ethyl ketoxime; an amino group such as dimethylamino or diethylamino; an aminoxy group such as dimethylaminoxy or diethylaminoxy; an amido group such as methylcarbonylmethylamino; isocyanate group; hydroxyl group; and chlorine atom. $R^8$ is selected from an alkyl group such as methyl, ethyl, propyl, or butyl; an alkenyl group such as vinyl; and an aryl group such as phenyl. The $R^8$ groups may be a combination of two or more of the above groups.

Representative examples of such silicon compound (B) include methyltriacetoxysilane, ethyltriacetoxysilane, vinyltriacetoxysilane, and partially hydrolyzed products obtained therefrom; acyloxy group-containing compounds such as diacetoxydibutoxysilane and triacetoxybutoxysilane and partially hydrolyzed products obtained therefrom; ethyl orthosilicate, propyl orthosilicate, and partially hydrolyzed products obtained therefrom; alkoxy group-containing compounds such as methyltrimethoxysilane and methyltriethoxysilane and partially hydrolyzed products obtained therefrom; oxime compounds such as methyltris(acetone oxime)silane and methyltris(methyl ethyl ketoxime)silane and partially hydrolyzed products obtained therefrom; aminosilanes such as methyltris(diethylamino)silane; isocyanate group-containing compounds such as tetraisocyanatosilane; and low molecular weight polymethylsiloxane comprising trimethylsiloxane units and $SiO_2$ units and having at least three silicon-bonded hydroxyl groups per molecule.

The amount of silicon compound (B) used to produce the silicone-based composite rubber composition of this invention is generally from 0.005 to 50 parts by weight, preferably from 0.01 to 30 parts by weight, more preferably from 0.02 to 20 parts by weight, per 100 parts by weight of rubber-forming polymer (A) containing, as main components, polyorganosiloxane (I) and organic rubber (II) both described hereinabove. If the amount of silicon compound (B) is below 0.005 part by weight, it results in insufficient hydrolysis and condensation reactions. On the other hand, if the amount thereof exceeds 50 parts by weight, the resulting composition is so low in viscosity that final vulcanized products will have impaired strengths.

The rubber composition of this invention is produced from a blend of rubber-forming polymer (A) containing the above-described polyorganosiloxane (I) and organic rubber (II), silicon compound (B) described above, and a heavy metal compound, amine, or quaternary ammonium salt (C) that will be described later; component (B) undergoes hydrolysis and condensation reactions with polyorganosiloxane (I), with component (C) acting as catalyst, thereby yielding a composite rubber composition.

Through the hydrolysis and condensation reactions, component (B) and component (I) form a network structure, and this network polymer is microscopically entangled with component (II), thereby enabling the resulting composition to be a more stable dispersion. This improvement in microscopic dispersion brings about the various effects of this invention described later.

From the standpoint of cold resistance, the average particle diameter of such network polymer present in the composition is preferably 20 $\mu$m or less, more preferably 10 $\mu$m or less, most preferably 5 $\mu$m or less.

From the standpoints of the prevention of bleeding and improvement in processability, the toluene-insoluble content in the above network polymer is preferably 30% by weight or higher, more preferably 50% by weight or higher, based on the weight of the network polymer.

Component (C) is not particularly limited as long as it catalyzes the hydrolysis and condensation reactions. Examples of component (C) include metal salts of organic acids such as stannous octoate and lead octoate; alkyltin compounds such as dibutyltin dimethoxide, dibutyltin diacetate, dibutyltin dioctoate, dibutyltin dilaurate, dimethyltin monooleate hydroxide, dibutyltin oxide, and tributyltin oxide dimer; amines such as dimethylhexylamine, dimethyldodecylamine, tri-n-butylamine, trimethylenetetramine, tetramethylenepentamine, tetramethylguanidine, and diethylhydroxylamine; and quaternary ammonium salts such as tetramethylammonium acetate and trimethylhexylammonium chloride.

The amount of such component (C) used for producing the rubber composition of this invention varies depending on the amount of hydrolyzable groups present in polyorganosiloxane (I). However, the amount of component (C) is from 0.0001 to 10 parts by weight, preferably from about 0.001 to 5 parts by weight, per 100 parts by weight of component (A). If the amount of component (C) is below 0.0001 part by weight, the hydrolysis and condensation reactions of component (B) with component (I) are insufficient, so that the resulting composition shows poor roll processability and gives vulcanized products insufficient in mechanical strength, heat resistance, and cold resistance. On the other hand, even if component (C) is used in an amount exceeding 10 parts by weight, the roll processability of the resulting composition cannot be improved any more, and final vulcanized products will have low mechanical strength and poor heat resistance.

In producing the composition of this invention, no particular limitation is imposed on the method for introducing the necessary ingredients into a kneading machine, the order of the introduction of the ingredients, kneading method, and the kneading machine. For example, the following methods can be employed: (1) a method in which components (I) and (II) in component (A) are, simultaneously or one after the other, kneaded sufficiently and softened by means of a kneading machine such as a Banbury mixer, a kneader, or a two-roll mill, subsequently component (B) is added to and kneaded with the softened mixture, and finally component (C) is added to and kneaded with the above-obtained mixture; (2) a method in which components (I) and (II) in component (A) and component (B) are kneaded together and homogenized beforehand by means of a kneading machine such as those described above, and then component (C) is kneaded with the above-obtained mixture; (3) a method in which a filler is added beforehand to component (II) in component (A), and then the other components are blended with the component (II); or (4) a method in which a reinforcing filler such as fumed silica or precipitated silica and additives such as a heat resistance improver are added beforehand to component (A), subsequently component (B) is kneaded with the component (A) by means of a kneading machine such as those described above, and then component (C) is added to and kneaded with the above-obtained mixture.

To the composition of this invention, which contains components (A) to (C) as major components, other known ingredients may be added, which are commonly used for natural rubber and synthetic rubbers including silicone rubbers.

Examples of reinforcing fillers and extenders include fumed silica, precipitated silica, fine quartz powder, diatomaceous earth, carbon black, zinc white, basic magnesium carbonate, activated calcium carbonate, calcium silicate, magnesium silicate, aluminum silicate, titanium dioxide, talc, mica powder, aluminum sulfate, calcium sulfate, barium sulfate, asbestos, glass fibers, organic reinforcements, and organic fillers.

Other additives that may be suitably added include processing aids (e.g., amines, fatty acids, and fatty acid derivatives), plasticizers (e.g., polydimethylsiloxane oil, diphenylsilanediol, trimethylsilanol, phthalic acid derivatives, adipic acid derivatives, and sebacic acid derivatives), softening agents (e.g., lubricating oils, process oils, coal tar, castor oil, and calcium stearate), antioxidants (e.g., phenylenediamines, phosphates, quinolines, cresols, phenols, and metal salts of dithiocarbamates), heat stabilizers (e.g., iron oxide, cerium oxide, potassium hydroxide, iron naphthenate, and potassium naphthenate), coloring agents, UV absorbers, flame retardants, oil resistance improvers, foaming agents, scorch retarders, tackifiers, lubricants, etc.

The above additives may be added during the process for producing the silicone-based composite rubber composition of this invention according to need. Alternatively, they may be added when the rubber composition produced is used to produce a crosslinkable, silicone-based composite rubber composition.

To the rubber composition thus prepared, a crosslinking agent for organic rubber (II) and other additives are added, and the resulting mixture is kneaded in an ordinary kneading machine such as rolls or a Banbury mixer, thereby forming a crosslinkable, silicone-based composite rubber composition, which can then be shaped and vulcanized.

If desired and necessary, a crosslinking accelerator, a crosslinking aid, a supplement accelerator, a crosslinking retarder, or the like may be used along with the crosslinking agent, when the crosslinkable, silicone-based composite rubber composition of this invention is crosslinked.

The crosslinking can be accomplished by applying an energy such as heat, electron beams, ultraviolet rays, electromagnetic waves, etc., to the composition.

As the crosslinking agent for organic rubber (II), any of ordinarily used vulcanizing agents for rubbers may be used, such as sulfur or derivatives thereof, organic peroxides, alkylphenol resins, and ammonium benzoate. Further, a polyfunctional crosslinking agent having two or more functional groups reactive to the crosslinkable groups contained in organic rubber (II) may be used as the crosslinking agent for organic rubber (II).

Examples of organic peroxides that can be used as the crosslinking agent include 2,5-dimethyl-2,5-di(t-butylperoxy)hexyne-3, 2,5-dimethyl-2,5-di(t-butylperoxy)hexane, 2,2'-bis(t-butylperoxy)-p-diisopropylbenzene, dicumyl peroxide, di-t-butyl peroxide, t-butyl perbenzoate, 1,1-bis(t-butylperoxy)-3,3,5-trimethylcyclohexane, 2,4-dichlorobenzoyl peroxide, benzoyl peroxide, and p-chlorobenzoyl peroxide. Preferred of these are 2,5-dimethyl-2,5-di(t-butylperoxy)hexyne-3, 2,5-dimethyl-2,5-di(t-butylperoxy)hexane, and 2,2'-bis(t-butylperoxy)-p-diisopropylbenzene.

The polyfunctional crosslinking agent having two or more functional groups reactive to the crosslinkable group present in organic rubber (II) is preferably one having two or more functional groups that are at least one kind selected from the group consisting of amino group, isocyanate group, maleimide group, epoxy group, halogen atom, hydroxyl group, and carboxyl group. Examples of such polyfunctional crosslinking agent include diamines, polyamines, diisocyanates, polyisocyanates, maleimides, diepoxides, diols, polyols, bisphenols, and dicarboxylic acids.

Specific examples of such compounds include N,N'-phenylenedimaleimide, hexamethylenediamine, 2,2-bis(4'-hydroxyphenyl)propane, and 2,2-bis(4'-hydroxyphenyl)hexafluoropropane.

In the case where organic rubber (II) is an elastomer in which an epoxy group has been incorporated, a polyamine carbamate, an ammonium salt of an organic carboxylic acid, a salt of dithiocarbamic acid, or an alkali metal salt of an organic carboxylic acid can be used as the crosslinking agent for the organic rubber (II).

In the case where organic rubber (II) is an elastomer in which a halogen atom has been incorporated, a polyamine carbamate, an ammonium salt of an organic carboxylic acid, or an alkali metal salt of an organic carboxylic acid can be used as the crosslinking agent for the organic rubber (II).

The amount of the crosslinking agent added is as follows. Where sulfur is used as the crosslinking agent, it is added in an amount of from 0.1 to 5 parts by weight, preferably from 0.5 to 3 parts by weight, per 100 parts by weight of the rubber composition of this invention. Where the organic peroxide described above is used, it is added in an amount of from 0.01 to 10 parts by weight, preferably from 0.1 to 5 parts by weight, per 100 parts by weight of the rubber composition. Where the polyfunctional crosslinking agent is used, it is added in an amount of from 0.01 to 10 parts by weight, preferably from 0.1 to 5 parts by weight, per 100 parts by weight of the rubber composition of this invention. If the amount of the crosslinking agent used is too small, the crosslinking density of the rubber component becomes too low, resulting in insufficient mechanical strength, oil resistance, and creep resistance. If the amount thereof is too large, the crosslinking density of the rubber component becomes so high that vulcanized products obtained from the crosslinkable rubber composition show poor elongation.

In crosslinking the rubber component, bifunctional vinyl monomers or other bifunctional compounds can be used as crosslinking aid. Examples of such crosslinking aid include ethylene glycol dimethacrylate, 1,3-butanediol dimethacrylate, 1,4-butanediol dimethacrylate, 1,6- hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, trimethylolpropane triacrylate, pentaerythritol triacrylate, divinylbenzene, N,N'-methylenebisacrylamide, p-quinonedioxime, p,p'-dibenzoylquinone dioxime, triazine dithiol, triallyl cyanurate, triallyl isocyanurate, and bismaleimide.

In order to crosslink (vulcanize) the crosslinkable, silicone-based composite rubber composition described above, it is subjected to primary vulcanization which is normally effected at 80° to 200° C. for a period of several minutes to 3 hours under a pressure of 20 to 200 kg/cm$^2$. If necessary, secondary vulcanization is performed at 80° to 200° C. for 1 to 48 hours, thereby yielding a vulcanized rubber product.

As described above, the silicone-based composite rubber composition of the present invention can be left to stand for a long period of time without experiencing any phase separation, which occurs with mere blends of silicone rubber and organic rubbers.

Further, in the case of a mere blend of silicone rubber and an organic rubber and also in the case of such a blend which further contains a filler and other additives, these blends show poor processability on rolls when crosslinking agents, crosslinking accelerators, etc. are added to these blends by means of a roll mill, because such conventional blends take much time to wind around the rolls. In contrast, the rubber composition of this invention has markedly improved roll processability and, hence, can be wound instantaneously around rolls.

The rubber products obtained by crosslinking (vulcanizing) the crosslinkable, silicone-based composite rubber composition of this invention show high mechanical strength and excellent heat, cold, and oil resistance, and hence can be used in general industries and in the chemical field. Since the crosslinked rubber products (vulcanizates) obtained from the crosslinkable, silicone-based composite rubber composition of this invention show high mechanical strength and are excellent in heat resistance, cold resistance, and oil resistance as described above, the crosslinkable composition of the invention is especially useful for producing oil seals and rubber hoses.

In the case where the crosslinkable, silicone-based composite rubber composition of the present invention is used for producing oil seals or rubber hoses, it is preferred that the average particle diameter of the network polymer consisting of polyorganosiloxane (I) and silicon compound (B) in the rubber composition be 20 μm or less.

When a rubber hose is produced by using the crosslinkable, silicone-based composite rubber composition, the inner layer and/or the outer of the rubber hose is formed from the rubber composition.

In the above case, a reinforcing braided-yarn layer may be provided as an intermediate layer between the inner layer and the outer layer. Alternatively, a layer of an ordinary rubber may be provided as the intermediate layer.

If such reinforcing braided-yarn layer is formed, vinylon, nylon, polyester, aramid, or carbon fibers or wires are used as a material for the reinforcing braided-yarn. The outer layer may be made from a conventional rubber material in place of the rubber composition of this invention. Examples of such conventional rubber material include synthetic rubbers such as chloroprene, chlorosulfonated polyethylene, epichlorohydrin rubbers, and ethylene-acrylic ester copolymer rubbers.

The present invention will be explained in more detail by reference to the following Examples and Comparative Examples.

In the Examples and Comparative Examples, various properties of the rubber compositions prepared therein were evaluated or determined according to the following test methods.

Of roll processing properties, winding time was measured as follows. A compounded rubber composition was thrown on 6-inch rolls adjusted to have a surface temperature of 50° C. and to rotate at 20 rpm (front roll) and at 28 rpm (back roll), with a roll nip being 2 mm. The time required for the composition to completely wind around a roll was measured.

Bleeding of polyorganosiloxane as another roll processing property was evaluated as follows. A sheet of rubber composition formed by roll kneading which had been conducted under the same conditions as in the above-described winding time test was left to stand at room temperature for 16 hours, and then the surface gloss of the sheet was visually examined for the occurrence of bleeding.

Measurements of initial physical properties, aging test, impact brittleness test at low temperature, and oil resistance test (70 hour-immersion at 150° C. in JIS #3 oil) were made in accordance with JIS K 6301 under the conditions shown in Table 1.

Heat resistance and cold resistance were evaluated on rubber hoses according to the following test methods.

The rubber hose used for the evaluation of heat resistance was a test piece having an outer diameter of 13 mm, an inner diameter of 7 mm, and a length of 200 mm, its rubber wall having an intermediate layer that was a reinforcing braided-yarn layer made of polyester fibers. Heat resistance was evaluated by placing the rubber hose in a Geer oven at 200° C. for 70 hours (at 130° C. for 70 hours in the case of rubber hoses containing NBR) to accelerate the aging of the hose, subsequently leaving the aged rubber hose to stand at room temperature for 3 hours or more, and then abruptly bending the resulting rubber hose at an angle of 90° to check the occurrence of cracking.

Cold resistance was evaluated using a rubber hose having the same size and structure as that used in the heat resistance test above. The rubber hose was cooled at −40° C. for 5 hours and then bent at an angle of 180° within a period of 4 seconds along the periphery of a cylinder having a radius of 38 mm, and the occurrence of cracking was checked.

In the Table below, rubber hose samples which showed no abnormality such as cracking in the heat resistance or cold resistance test are indicated by o and those which underwent cracking or breaking in the test are indicated by X.

REFERENCE EXAMPLE 1

100 Parts by weight of linear polydimethylsiloxane which had a silicon-bonded hydroxyl group at both ends of the molecule thereof, was represented by the above-described average composition formula wherein a was 2.000, and had an average degree of polymerization of 100 was uniformly mixed in a Henschel mixer with 35 parts by weight of a silica fine powder which had been made hydrophobic by surface treatment with polysiloxane. Thus, a silicone rubber composition (i) was prepared.

REFERENCE EXAMPLE 2

100 Parts by weight of substantially linear polymethylsiloxane which had a silicon-bonded hydroxyl group at both ends of the molecule thereof, was represented by the above-described average composition formula wherein a was 1.990, and had an average degree of polymerization of 500 was uniformly mixed in a Henschel mixer with 25 parts by weight of a silica fine powder which had been made hydrophobic by surface treatment with polysiloxane. Thus, a silicone rubber composition (ii) was prepared.

EXAMPLE 1

An acrylic rubber (AR 101 manufactured by Japan Synthetic Rubber Co., Ltd., Japan) was used as organic rubber (II), silicone rubber composition (i) prepared in Reference Example 1 was used as a composition containing polyorganosiloxane (I), and a partially hydrolyzed condensate of ethyl silicate (Ethyl Silicate 40 manufactured by Union Carbide Corporation and having a silicon dioxide content of 40 wt %) was used as silicon compound (B).

The acrylic rubber and silicone rubber composition (i) were introduced, in this order, into a rubber mixer (heated at 60°-80° C. and rotating at 60 rpm) in the respective amounts shown in the Table below, and then kneaded. At the time when the mixture became uniform, dibutyltin dilaurate was added thereto. The resulting mixture was kneaded until it became uniform, and the uniform composition was discharged from the mixer, when the rubber composition had a temperature of 150° to 200° C.

Subsequently, the rubber composition discharged was evaluated for roll processability by examining the winding of the composition around the rolls of a two-roll mill. After the composition was formed into a sheet using the roll mill, the surface of the sheet was examined for bleeding of the polyorganosiloxane. Thereafter, the sheeted rubber composition was again subjected to the two-roll mill and allowed to wind around the rolls, and the filler, vulcanizing agent, and other additives shown in the Table below were added for further kneading. The kneaded compound was subjected to press vulcanization, which was performed at 170° C. for 20 minutes under a pressure of 100 to 150 kg/cm$^2$. Physical properties of the thus-vulcanized rubber product were evaluated and the results obtained are shown in the Table below.

EXAMPLE 2

Using an ethylene-propylene rubber (JSR EP43 manufactured by Japan Synthetic Rubber Co., Ltd.) as organic rubber (II) and propyl silicate as silicon compound (B), a crosslinkable, silicone-based composite rubber composition was prepared by conducting the same steps as in Example 1, the formulation for the composition being given in Table 1. The crosslinkable composition thus obtained was evaluated and the results obtained are shown in the Table below.

EXAMPLE 3

Using a nitrile rubber (JSR N230S manufactured by Japan Synthetic Rubber Co., Ltd.) as organic rubber (II) and silicone rubber composition (i) prepared in Reference Example 1 as a composition containing polyorganosiloxane (I), a crosslinkable, silicone-based composite rubber composition was prepared by conducting the same steps as in Example 1, the formulation for the composition being given in the Table below. The crosslinkable composition thus obtained was evaluated and the results obtained are shown in the Table below.

EXAMPLE 4

Using a fluororubber (JSR Aflas 150P manufactured by Japan Synthetic Rubber Co., Ltd.) as organic rubber (II) and silicone rubber composition (i) prepared in Reference Example 1 as a composition containing polyorganosiloxane (I), a crosslinkable, silicone-based composite rubber composition was prepared by conducting the same steps as those in Example 1, the formulation for the composition being given in the Table below. The crosslinkable composition thus obtained was evaluated and the results obtained are shown in the Table below.

EXAMPLE 5

Using an ethylene-acrylic acid copolymer rubber (VAMAC B124 manufactured by E. I. Du Pont de Nemours & Co., Ltd.) as organic rubber (II), silicone rubber composition (ii) prepared in Reference Example 2 as a composition containing polyorganosiloxane (I), and methyltris(methyl ethyl ketoxime)silane as silicon compound (B), a crosslinkable, silicone-based composite rubber composition was prepared by conducting the same steps as in Example 1, the formulation for the composition being given in the Table below. The crosslinkable composition thus obtained was evaluated and the results obtained are shown in the Table below.

EXAMPLE 6

Using a hydrin rubber (Epikuromer H manufactured by Osaka Soda Co., Ltd., Japan) as organic rubber (II), silicone rubber composition (ii) prepared in Reference Example 2 as a composition containing polyorganosiloxane (I), and methyltriacetoxysilane as silicon compound (B), a crosslinkable, silicone-based composite rubber composition was prepared by conducting the same steps as in Example 1, the formulation for the composition being given in the Table below. The crosslinkable composition thus obtained was evaluated and the results obtained are shown in the Table below.

EXAMPLE 7

Using chlorosulfonated polyethylene (Denka CSM manufactured by Denki Kagaku Kogyo K.K., Japan) as organic rubber (II) and silicone rubber composition (ii) prepared in Reference Example 2 as a composition containing polyorganosiloxane (I), a crosslinkable, silicone-based composite rubber composition was prepared by conducting the same steps as in Example 1, the formulation for the composition being given in the Table below. The crosslinkable composition thus obtained was evaluated and the results obtained are shown in the Table below.

EXAMPLE 8

Using a hydrogenated NBR (Zetpol 1020 manufactured by Nippon Zeon Co., Ltd., Japan) as organic rubber (II) and silicone rubber composition (ii) prepared in Reference Example 2 as a composition containing polyorganosiloxane (I), a crosslinkable, silicone-based composite rubber composition was prepared by conducting the same steps as in Example 1, the formulation for the composition being given in the Table below.

The crosslinkable composition thus obtained was evaluated and the results obtained are shown in the Table below.

EXAMPLE 9

Using an ethylene-propylene rubber (JSR EP43 manufactured by Japan Synthetic Rubber Co., Ltd.) as organic rubber (II), silicone rubber composition (i) prepared in Reference Example 1 as a composition containing polyorganosiloxane (I), and silicon compound (iii) prepared according to the method described below, a crosslinkable, silicone-based composite rubber composition was prepared by conducting the same steps as in Example 1, the formulation for the composition being given in the Table below. The crosslinkable composition thus obtained was evaluated and the results obtained are shown in the Table below.

Preparation of Silicon Compound (iii)

A mixture of 150 parts by weight of sodium silicate and 150 parts by weight of water was added dropwise to 280 parts by weight of 10% hydrogen chloride solution in water, thereby forming a silicic acid hydrosol containing a large amount of hydroxyl groups. This hydrosol was stabilized by adding thereto 140 parts by weight of isopropanol. Subsequently, a silane solution prepared by dissolving 108 parts by weight of trimethylchlorosilane in 108 parts by weight of xylene was added dropwise to the hydrosol obtained above. The resulting mixture was heated, with stirring, at 65°-75° C. for 2 hours to complete the reaction. Thereafter, 50 parts by weight of xylene was added to the reaction mixture, and the resulting mixture was allowed to stand to separate an aqueous layer, which was then removed.

The above-obtained organic layer was washed with an aqueous solution of common salt, dehydrated, filtered, and then subjected to vacuum devolatilization to completely revome the xylene. Thus, 78.5 parts by weight of a viscous resin substance was obtained. This substance was found to be a low molecular weight polysiloxane consisting of trimethylsiloxy units and $SiO_2$ units with the number of Si atoms being about 6 per molecule, and having 5.3 hydroxyl groups per molecule.

EXAMPLE 10

Using a fluororubber (JSR Aflas 150P manufactured by Japan Synthetic Rubber Co., Ltd.) as organic rubber (II), silicone rubber composition (ii) prepared in Reference Example 2 as a composition containing polyorganosiloxane (I), and silicon compound (iii) prepared in Example 9 as silicon compound (B), a crosslinkable, silicone-based composite rubber composition was prepared by conducting the same steps as in Example 1, the formulation for the composition being given in the Table below. The crosslinkable composition thus obtained was evaluated and the results obtained are shown in the Table below

COMPARATIVE EXAMPLES 1 TO 8

Crosslinkable rubber compositions were prepared in the same manner as in Examples 1 to 8, respectively, except that the silicon compounds (B) were not used. The compositions thus obtained were evaluated and the results obtained are shown in the Table below.

TABLE

| | Example | | | | | | | | | |
|---|---|---|---|---|---|---|---|---|---|---|
| | 1 | 2 | 3 | 4 | 5 | 6 | 7 | 8 | 9 | 10 |
| Formulation (parts by weight) | | | | | | | | | | |
| Component (A), (I) | | | | | | | | | | |
| Silicone rubber composition (i) (Reference Ex.1) | 13.5 | 27 | 40.5 | 54 | — | — | — | — | 40.5 | — |
| Silicone rubber composition (ii) (Reference Ex.2) | — | — | — | — | 62.5 | 37.5 | 12.5 | 50 | — | 37.5 |
| Component (A), (II) | | | | | | | | | | |
| Acrylic rubber (JSR AR101) | 90 | — | — | — | — | — | — | — | — | — |
| Ethylene-propylene rubber (JSR EP43) | — | 80 | — | — | — | — | — | — | 70 | — |
| Nitrile rubber (JSR N230S) | — | — | 70 | — | — | — | — | — | — | — |
| Fluororubber (JSR Aflas 150P) | — | — | — | 60 | — | — | — | — | — | 70 |
| Ethylene-acrylic acid copolymer rubber (VAMAC B124) | — | — | — | — | 50 | — | — | — | — | — |
| Hydrin rubber (Epikuromer H) | — | — | — | — | — | 70 | — | — | — | — |
| Chlorosulfonated polyethylene (Denka CSM) | — | — | — | — | — | — | 90 | — | — | — |
| Hydrogenated NBR (Zetpol 1020) | — | — | — | — | — | — | — | 60 | — | — |
| Component (B) | | | | | | | | | | |
| Partially hydrolyzed condensate of ethyl silicate (Ethyl Silicate 40) | 0.5 | — | — | 2 | — | — | 1 | — | — | — |
| Propyl silicate | — | 0.7 | 2.0 | — | — | — | — | — | — | — |
| Methytrioximesilane | — | — | — | — | 5 | — | — | 4 | — | — |
| Ethyltriacetoxysilane | — | — | — | — | — | 3 | — | — | — | — |
| Silicon compound (iii) | — | — | — | — | — | — | — | — | — | 5 |
| Component (C) | | | | | | | | | | |
| Dibutyltin dilaurate | 0.1 | 0.1 | — | — | 0.02 | — | — | — | — | — |
| Tin octoate | — | — | 0.5 | — | — | 0.4 | — | 0.5 | — | — |
| Dibutyltin oxide | — | — | — | 0.3 | — | — | 0.3 | — | — | — |

TABLE-continued

| | | | | | | | | | | |
|---|---|---|---|---|---|---|---|---|---|---|
| Dimethylhexylamine | — | — | — | — | — | — | — | — | 0.2 | — |
| Tetramethylammonium acetate | — | — | — | — | — | — | — | — | — | 0.4 |
| Other ingredients | | | | | | | | | | |
| Stearic acid | 1 | 1 | 1 | — | 1 | 1 | 1 | 1 | 1 | — |
| Silica (Nipsil LP of Nippon Silica Industrial Co., Ltd.) | 45 | 30 | — | 10 | — | 30 | 40 | — | — | — |
| Silane coupling agent (TSL8370 of Toshiba Silicone Co., Ltd.) | 1 | — | — | — | — | 1 | — | — | — | — |
| Silane coupling agent (TSL8350 of Toshiba Silicone Co., Ltd.) | — | 1 | — | 1 | — | — | 1 | — | — | — |
| Peroxide (Perkadox 14/40 of Kayaku Noury Co.) | 1 | 3 | 2 | 2 | — | — | 2 | 2 | 4 | 3 |
| Crosslinking aid (Vulnoc PM Ouchi-Shinko Chemical Industrial Co., Ltd.) | 1 | — | — | — | — | — | 1 | 1 | — | — |
| Carbon black (Seast SO of Tokai Carbon Co., Ltd.) | — | — | 35 | — | 25 | — | — | 30 | 30 | 10 |
| Process oil (Process Oil PW-380 of Idemitsu Kosan Co., Ltd.) | — | 10 | — | — | — | — | — | — | 10 | — |
| Sulfur | — | 0.2 | — | — | — | — | — | — | 0.2 | — |
| Crosslinking aid (triallyl isocyanurate) | — | — | — | 5 | — | — | — | — | — | 5 |
| Vulcanizing agent (Diac No. 1 of E.I. du Pont de Nemours & Co., Ltd.) | — | — | — | — | 1 | — | — | — | — | — |
| Vulcanization accelerator (Nocceler D of Ouchi-Shinko Chemical) | — | — | — | — | 4 | 0.3 | — | — | — | — |
| Vulcanizing agent (Zisnet F of Sankyo Kasei Co., Ltd.) | — | — | — | — | — | 0.9 | — | — | — | — |
| Magnesium oxide | — | — | — | — | — | 3 | 3 | — | — | — |
| Results of evaluation | | | | | | | | | | |
| Roll processability | | | | | | | | | | |
| Time to winding (min) | 0.5 | 0.4 | 0.5 | 0.5 | 0.5 | 0.3 | 0.3 | 0.5 | 0.4 | 0.4 |
| Bleeding of polyorganosiloxane | negative | negative | negative | negative | negative | negative | negative | negative | negative | negative |
| Initial physical properties (vulcanization conditions: 170° C. × 20 min press vulcanization followed by 175° C. × 4 hr oven vulcanization) | | | | | | | | | | |
| Tensile strength (kgf/cm²) | 130 | 135 | 115 | 105 | 97 | 103 | 121 | 110 | 127 | 120 |
| Elongation (%) | 250 | 350 | 210 | 260 | 200 | 220 | 280 | 220 | 310 | 270 |
| **Aging test (175° C. × 70 hr in Geer oven*)** | | | | | | | | | | |
| Tensile strength (kgf/cm²) | −10 | −25 | −92 | −5 | −21 | −31 | −28 | −65 | −21 | −3 |
| Elongation (%) | −35 | −45 | −100 | −6 | −30 | −52 | −75 | −72 | −40 | −5 |
| Impact brittleness test at low temperature | | | | | | | | | | |
| Brittleness temperature (°C.) | −35 | −65 | −45 | −63 | −55 | −45 | −48 | −48 | −68 | −55 |
| Oil resistance test (150° C. × 70 hr in JIS #3 oil) | | | | | | | | | | |
| Change in tensile strength (%) | −15 | −15 | −28 | −31 | −42 | −39 | −48 | −18 | −49 | −40 |
| Change in elongation (%) | −21 | −62 | −35 | −37 | −36 | −44 | −46 | −23 | −58 | −42 |
| Change in volume (%) | +21 | +85 | +22 | +23 | +31 | +28 | +45 | +21 | +78 | +29 |
| Heat resistance of rubber hose | c | c | c | o | o | o | c | c | c | o |
| Cold resistance of rubber hose | o | o | o | c | o | o | o | o | o | o |

| | Comparative Example | | | | | | | |
|---|---|---|---|---|---|---|---|---|
| | 1 | 2 | 3 | 4 | 5 | 6 | 7 | 8 |
| Formulation (parts by weight) | | | | | | | | |
| Component (A), (I) | | | | | | | | |
| Silicone rubber composition (i) (Reference Ex.1) | 13.5 | 27 | 40.5 | 54 | — | — | — | — |
| Silicone rubber composition (ii) (Reference Ex.2) | — | — | — | — | 62.5 | 37.5 | 12.5 | 50 |
| Component (A), (II) | | | | | | | | |

TABLE-continued

| | | | | | | | | |
|---|---|---|---|---|---|---|---|---|
| Acrylic rubber (JSR AR101) | 90 | — | — | — | — | — | — | — |
| Ethylene-propylene rubber (JSR EP43) | — | 80 | — | — | — | — | — | — |
| Nitrile rubber (JSR N230S) | — | — | 70 | — | — | — | — | — |
| Fluororubber (JSR Aflas 150P) | — | — | — | 60 | — | — | — | — |
| Ethylene-acrylic acid copolymer rubber (VAMAC B124) | — | — | — | — | 50 | — | — | — |
| Hydrin rubber (Epikuromer H) | — | — | — | — | — | 70 | — | — |
| Chlorosulfonated polyethylene (Denka CSM) | — | — | — | — | — | — | 90 | — |
| Hydrogenated NBR (Zetpol 1020) | — | — | — | — | — | — | — | 60 |
| Component (B) | | | | | | | | |
| Partially hydrolyzed condensate of ethyl silicate (Ethyl Silicate 40) | — | — | — | — | — | — | — | — |
| Propyl silicate | — | — | — | — | — | — | — | — |
| Methytrioximesilane | — | — | — | — | — | — | — | — |
| Ethyltriacetoxysilane | — | — | — | — | — | — | — | — |
| Silicon compound (iii) | 5 | — | — | — | — | — | — | — |
| Component (C) | | | | | | | | |
| Dibutyltin dilaurate | — | — | — | — | — | — | — | — |
| Tin octoate | — | — | — | — | — | — | — | — |
| Dibutyltin oxide | — | — | — | — | — | — | — | — |
| Dimethylhexylamine | — | — | — | — | — | — | — | — |
| Tetramethylammonium acetate | — | — | — | — | — | — | — | — |
| Other ingredients | | | | | | | | |
| Stearic acid | 1 | 1 | 1 | — | 1 | 1 | 1 | 1 |
| Silica (Nipsil LP of Nippon Silica Industrial Co., Ltd.) | 45 | 30 | — | 10 | — | 30 | 40 | — |
| Silane coupling agent (TSL8370 of Toshiba Silicone Co., Ltd.) | 1 | — | — | — | — | 1 | — | — |
| Silane coupling agent (TSL8350 of Toshiba Silicone Co., Ltd.) | — | 1 | — | 1 | — | — | 1 | — |
| Peroxide (Perkadox 14/40 of Kayaku Noury Co.) | 1 | 3 | 2 | 2 | — | — | 2 | 2 |
| Crosslinking aid (Vulnoc PM Ouchi-Shinko Chemical Industrial Co., Ltd.) | 1 | — | — | — | — | — | 1 | 1 |
| Carbon black (Seast SO of Tokai Carbon Co., Ltd.) | — | — | 35 | — | 25 | — | — | 30 |
| Process oil (Process Oil PW-380 of Idemitsu Kosan Co., Ltd.) | — | 10 | — | — | — | — | — | — |
| Sulfur | — | 0.2 | — | — | — | — | — | — |
| Crosslinking aid (triallyl isocyanurate) | — | — | — | 5 | — | — | — | — |
| Vulcanizing agent (Diac No. 1 of E.I. du Pont de Nemours & Co., Ltd.) | — | — | — | — | 1 | — | — | — |
| Vulcanization accelerator (Nocceler D of Ouchi-Shinko Chemical) | — | — | — | — | 4 | 0.3 | — | — |
| Vulcanizing agent (Zisnet F of Sankyo Kasei Co., Ltd.) | — | — | — | — | — | 0.9 | — | — |
| Magnesium oxide | — | — | — | — | — | 3 | 3 | — |
| Results of evaluation | | | | | | | | |
| Roll processability | | | | | | | | |
| Time to winding (min) | 15 | 5 | 10 | 15 | 6 | 10 | 12 | 14 |
| Bleeding of polyorganosiloxane | positive | positive | positive | positive | positive | positive | positive | positive |
| Initial physical properties (vulcanization conditions: 170° C. × 20 min press vulcanization followed by 175° C. × 4 hr oven vulcanization) | | | | | | | | |
| Tensile strength (kgf/cm$^2$) | 65 | 81 | 55 | 61 | 50 | 71 | 81 | 65 |
| Elongation (%) | 150 | 160 | 120 | 180 | 140 | 170 | 150 | 130 |
| Aging test (175° C. × 70 hr in Geer oven*) | | | | | | | | |

TABLE-continued

| | | | | | | | | |
|---|---|---|---|---|---|---|---|---|
| Tensile strength (kgf/cm²) | −21 | −35 | −100 | −45 | −43 | −42 | −35 | −100 |
| Elongation (%) | −65 | −70 | −100 | −12 | −66 | −77 | −100 | −100 |
| Impact brittleness test at low temperature | | | | | | | | |
| Brittleness temperature (°C.) | −8 | −55 | −25 | −48 | −38 | −25 | −31 | −30 |
| Oil resistance test (150° C. × 70 hr in JIS #3 oil) | | | | | | | | |
| Change in tensile strength (%) | −31 | −70 | −43 | −44 | −61 | −47 | −71 | −44 |
| Change in elongation (%) | −48 | −72 | −48 | −50 | −58 | −38 | −62 | −45 |
| Change in volume (%) | +31 | +150 | +31 | +33 | +55 | +41 | +65 | +42 |
| Heat resistance of rubber hose | x | x | x | ○ | x | x | x | x |
| Cold resistance of rubber hose | x | c | x | ○ | x | x | ○ | x |

*) 130° C. × 70 hr for Example 3 and Comparative Example 3.

The silicone-based composite rubber composition of the present invention, which is in an unvulcanized state, shows greatly improved processability on rolls as compared to conventional rubber compositions, is free from bleeding of the polyorganosiloxane, and can be easily processed and shaped. Further, vulcanized products obtained from the rubber composition of this invention not only show high mechanical strengths, but are excellent in heat resistance, cold resistance, and oil resistance.

The crosslinkable, silicone-based composite rubber composition of this invention can be used extensively in the fields of various kinds of rubber products such as belts, hoses, gaskets, boots, vibration-damping rubbers, and tubes, and is especially suitable for use in the production of oil seals and rubber hoses.

Accordingly, the silicone-based composite rubber composition and the crosslinkable, silicone-based composite rubber composition of the present invention are industrially of great value.

While the invention has been described in detail and with reference to specific embodiments thereof, it will be apparent to one skilled in the art that various changes and modifications can be made therein without departing from the sprit and scope thereof.

What is claimed is:

1. A crosslinked silicone-based composite rubber composition comprising
   a silicone-based composite rubber composition which is obtained by compounding
   100 parts by weight of a rubber-forming polymer (A) containing as main components
   3 to 70% by weight of a polyorganosiloxane (I) represented by the average composition formula

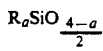

$$R_aSiO_{\frac{4-a}{2}}$$

wherein R is substituted or unsubstituted monovalent organic group or a hydroxyl group, with 0.005 to 3 mol % of the R groups being hydroxyl, and a is a number of 1.900 to 2.004 and having a degree of polymerization of 50 to 10,000, and
   97 to 30% by weight of an non-silicon containing organic rubber (II),
   0.005 to 50 parts by weight of a silicon compound (B) having at least two hydrolyzable groups per molecule which are able to undergo hydrolysis and condensation reactions with silanols, and
   0.0001 to 10 parts by weight of a heavy metal compound, amine or quaternary ammonium salt (C) which catalyzes said hydrolysis and condensation reactions; and
   allowing the resulting formulation to undergo hydrolysis and condensation reactions while the formulation is kept from being deformed by shearing; and
   a crosslinking agent subsequently added followed by crosslinking of said organic rubber (II).

2. The crosslinked silicone-based composite rubber composition as claimed in claim 1, wherein the substituted or unsubstituted monovalent organic group in the formula for the polyorganosiloxane is methyl, ethyl, propyl, vinyl, phenyl or halogen-substituted groups derived from such groups.

3. The crosslinked silicone-based composite rubber composition as claimed in claim 1, wherein the content of hydroxyl group in the formula is 0.01 to 2 mol %.

4. The crosslinked silicone-based composite rubber composition as claimed in claim 1, wherein a in the formula is from 1.950 to 2.002.

5. The crosslinked silicone-based composite rubber composition as claimed in claim 1, wherein the degree of polymerization of the polyorganosiloxane (I) is from 100 to 1,500.

6. The crosslinked silicone-based composite rubber composition as claimed in claim 1, wherein the terminals of the molecular chain of the polyorganosiloxane (I) is blocked with hydroxyl, alkoxy, trimethylsilyl, dimethylvinylsilyl, methylphenylvinylsilyl or methyldiphenylsilyl.

7. The crosslinked silicone-based composite rubber compoisition as claimed in claim 1, wherein the organic rubber (II) is natural rubber, isoprene rubber, styrene-butadiene rubber, chloroprene rubber, butadiene rubber, acrylonitrile-butadiene rubber, ethylene-α-olefin ruber, chlorosulfonated polyethylene, butyl rubber, fluororubber, acrylic rubber, epichlorohydrin rubber, ethylene-vinyl acetate rubber or ethylene-acrylic rubber.

8. The crosslinked silicone-based composite rubber composition as claimed in claim 7, wherein the organic rubber is acrylic rubber, fluororubber, acrylonitrile-butadiene rubber, epichlorohydrin rubber, or ethylene-acrylic rubber.

9. The crosslinked silicone-based composite rubber compoisition as claimed in claim 1, wherein the organic rubber (II) has a Mooney viscosity (ML$_{1+4}$, 100° C.) of from 10 to 200.

10. The crosslinked silicone-based composite rubber composition as claimed in claim 1, wherein the proportion of the polyorganosiloxane (I) to the organic rubber (II) is from 5:95 to 50:50 by weight.

11. The crosslinked silicone-based composite rubber composition as claimed in claim 1, wherein the silicon compound (B) is an organosilane represented by the formula $$R^8{}_cSiX_{4-c}$$

wherein $R^8$ is a monovalent hydrocarbon group, X is a group directly bonded to silicon atom, with the Si-X bond being hydrolyzable, and a partially hydrolyzed condensate thereof.

12. The crosslinked silicone-based composite rubber composition as claimed in claim 1, wherein the amount of the silicon compound (B) is 0.01 to 30 parts by weight per 100 parts by weight of the rubber-forming polymer.

13. The crosslinked silicone-based composite rubber composition as claimed in claim 1, wherein the heavy metal compound for component (C) is metal salts of organic acid, or alkyltin compound.

14. The crosslinked silicone-based composite rubber composition as claimed in claim 1, wherein the amines for component (C) are dimethylhexylamine, dimethyldodecylamine, tri-n-butylamine, trimethylenetetramine, tetramethylenepentamine, tetramethylguanidine or diethylhydroxyamine.

15. The crosslinked silicone-based composite rubber composition as claimed in claim 1, wherein the quaternary ammonium salt for component (C) is tetramethylammonium acetate or trimethylhexylammonium chloride.

16. The crosslinked silicone-based composite rubber composition as claimed in claim 1, wherein the amount of component (C) is 0.001 to 5 parts by weight per 100 parts by weight of the rubber-forming polymer (A).

17. An oil seal obtained from the crosslinkable, silicone-based composite rubber composition of claim 1.

18. A rubber hose comprising an outer layer and an inner layer, wherein at least one of the outer layer and the inner layer is obtained from the crosslinked, silicone-based composite rubber composition of claim 1.

* * * * *